United States Patent
Desgurse et al.

[15] 3,669,940

[45] June 13, 1972

[54] TWO-STEP BULK POLYMERIZATION OF PIVALOLACTONE

[72] Inventors: Paul J. A. Desgurse; Harm P. Rogaar, both of Amsterdam, Netherlands

[73] Assignee: Shell Oil Company, New York, N.Y.

[22] Filed: Oct. 9, 1969

[21] Appl. No.: 864,990

[30] Foreign Application Priority Data

March 10, 1969 Netherlands..........................6903704

[52] U.S. Cl. ..........................................260/78.3 R, 260/95
[51] Int. Cl......................................................C08g 17/017
[58] Field of Search....................................260/78.3; 23/260

[56] References Cited

FOREIGN PATENTS OR APPLICATIONS 1,090,780  11/1967  Great Britain
  264,931   6/1964  Netherlands

*Primary Examiner*—William H. Short
*Assistant Examiner*—E. Nielsen
*Attorney*—Philip D. Freeman and Joseph W. Brown

[57] ABSTRACT

Between 50 and 85 per cent of a beta-lactone such as pivalolactone is bulk polymerized in an initial reactor at a maximum temperature of 300° C. The polymerization is then continued in at least one subsequent reactor. Preferably, the reactors are gear pumps.

6 Claims, 3 Drawing Figures

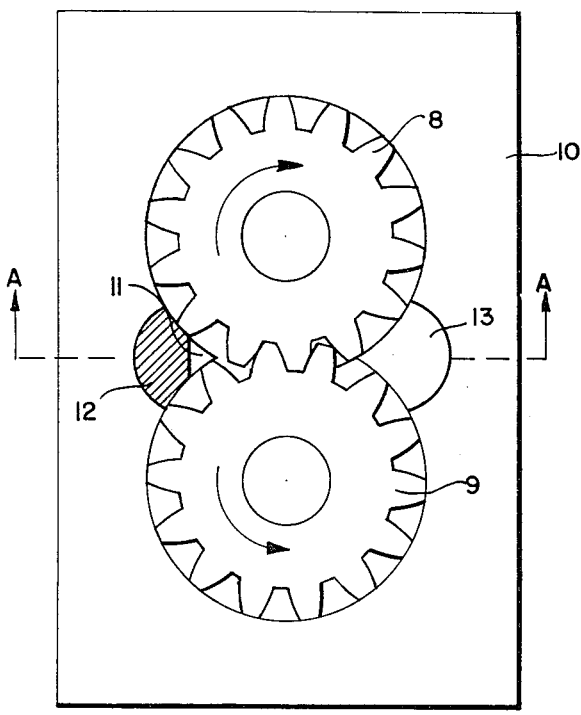
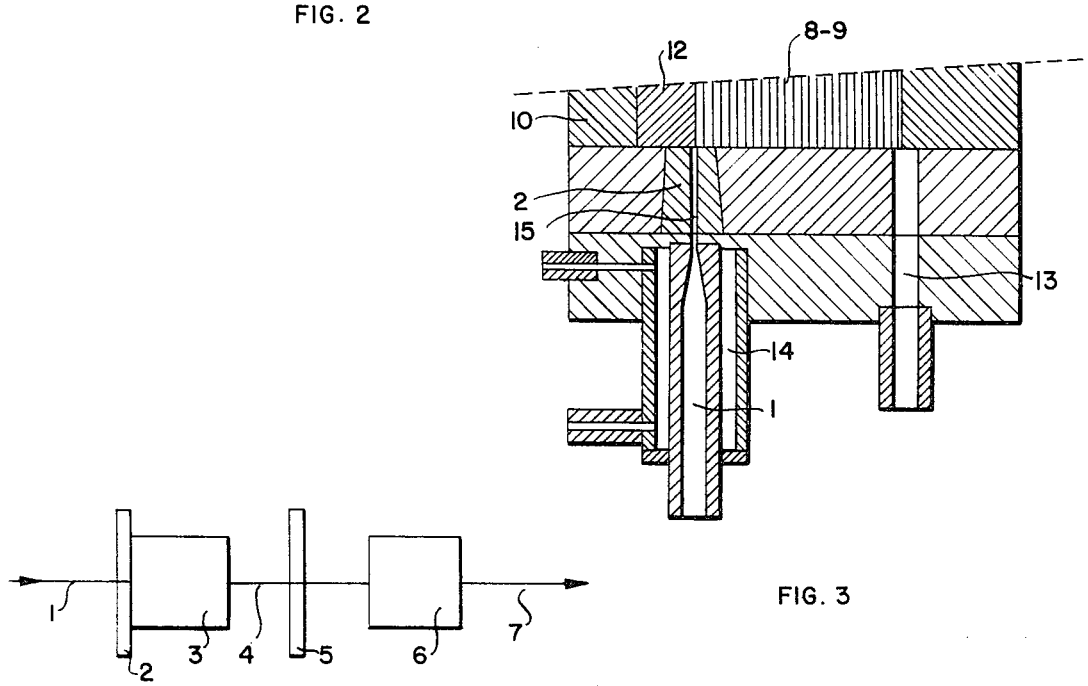
FIG. 2
FIG. 3
FIG. 1
INVENTORS:
PAUL J.A. DESGURSE
HARM P. ROGAAR
BY:
*Philip D. Freedman*
THEIR ATTORNEY

TWO-STEP BULK POLYMERIZATION OF PIVALOLACTONE

This invention relates to a process for the continuous bulk polymerization of a beta-lactone having a tertiary or quaternary alpha-carbon atom. The invention also relates to an apparatus for the continuous bulk polymerization of beta-lactones.

It is known that beta-lactones having a tertiary or quaternary carbon atom can be subjected to bulk polymerization in the presence of catalysts to give linear polyesters having a high molecular weight (see, for example, Klootwijk, U.S. Pat. No. 3,268,486, issued Aug. 23, 1966).

The polymerization of beta-lactones is an exothermic reaction and bulk polymerization thereof is attended with a sharp rise in temperature of the polymerizate. This rise in temperature causes the rate of polymerization to increase leading rapidly to complete or substantially complete reaction of the available monomer. If no special temperature controls are applied to the reaction the polymer product is formed at above its melting point as a high-viscosity liquid. Although continuous bulk polymerization at these high temperatures is not substantially detrimental to the forming poly-beta-lactone the temperatures may cause appreciable decomposition of the unpolymerized monomer. The gaseous products from this decomposition (isobutene and carbon dioxide in the case of pivalolactone) cause disturbances in the continuous transport of the polymerizing medium through the reaction apparatus and further cause loss of monomer thus decreasing conversion.

Generally, therefore, as long as a high percentage of unconverted monomer is present, it is recommended to keep the temperature of the polymerizing medium below 300° C. It is especially important that the polymerization reaction apparatus be maintained at temperatures below 300° C. Decomposition of monomer can be avoided in small reactors by external cooling. However, with the larger reactors usually used on a commercial scale only a small proportion of the total material in the reactors - that at the vessel surface - can be adequately cooled. In the larger reactors high temperatures and excessive decomposition of monomer are substantial problems.

The present invention relates to a process in which excessive decomposition of monomer is avoided. According to the invention a process is provided which comprises subjecting a beta-lactone having a tertiary or quaternary alpha-carbon atom to polymerization in an initial reaction zone at a temperature up to 300° C. until 50 to 85 percent of the lactone has been converted to polymer, and then continuing the polymerization in at least one subsequent reaction zone.

FIG. 1 of the drawings is a schematic block diagram of the process of the present invention.

FIG. 2 is a sectional representation of a first reaction zone in this invention which is a gear pump.

FIG. 3 is a sectional view of the gear pump of FIG. 2 along the line A—A.

The drawings will be described infra.

Preferably the first reaction zone is an apparatus with which liquid can be transported in discrete quantities. Polymerization can be effected in the working spaces of the apparatus. By "working space" is meant the space in which a certain discrete quantity of liquid is separated from the bulk of liquid in order to be transported. In general transportation is effected by the moving parts of the apparatus. Examples of this type of apparatus are certain types of pumps, such as piston pumps and gear pumps. In a piston pump the working space is formed by the maximum space between inlet valve and outlet valve that can be filled with material to be pumped. In a gear pump the working space comprises the spaces between the gear wheels inter se and in particular by the spaces between the gear wheels and the inner wall of the pump.

In this invention, gear pumps are preferred to piston pumps. The term "gear pump" used within the scope of this invention refers not only to pumps which consist essentially of a pair of intermeshing gear wheels, but also to the so-called lobe pumps which contain specifically shaped rotors with two or more lobes instead of teeth. External gear pumps consisting of a pair of intermeshing gears in close-fitting casing are preferred to internal gear pumps.

Whenever mentioned in the present specification and claims, the temperature of the polymerizing mass in the first reaction zone is understood to be the temperature of the mixture measured just before leaving the reactor. This temperature can be measured with the aid of a thermocouple fitted into the reactor wall so as to be in contact with the mixture close to the outlet side. The temperature is controlled so as not to exceed 300° C. Preferably the temperature in this first reaction zone is maintained between 200° and 300° C. This temperature depends upon the temperature of the mixture fed to the zone and on the degree of heat exchange between the polymerization medium and the surroundings.

Between 50 and 85 percent of the beta-lactone monomer is converted to polymer in this first reaction zone. Preferably between 60 and 85 percent is converted. Percentage conversion is determined by the rate of passage of the beta-lactone through the reaction zone and by the amount of polymerization catalyst present.

Preferably, one subsequent reaction zone is used. The zone can consist of an apparatus that is suitable for the transport of liquid, for example a gear pump. Preference is given to a tubular reactor in view of its simplicity. The transport through such a tubular reactor is effected by means of pressure that is applied on the mass after it has left the first reaction zone. If the first reaction zone is a pump the pressure can be supplied by the pump. In the subsequent reaction zones the polymerization of the beta-lactone is continued. Here the temperature may exceed 300° C. because the amount of beta-lactone monomer still present has been so reduced that partial decomposition no longer interferes with the transport of the polymerizing medium nor causes too great a loss of beta-lactone monomer. Preferably, the first reaction zone and the second reaction zone(s) are thermally insulated from each other to prevent flow of heat from the second zone(s) to the first. The thermal insulation can be effected, for instance, by providing thermal insulation material between the first and the second zones.

In practice, the polymerizing medium will be transported through the first reactor at such a high rate that only between 50 and 85 percent of the beta-lactone is polymerized and the temperature of the medium is maintained lower that 300° C. In the subsequent reactor(s) the polymerization is allowed to proceed without the addition of and/or the application or removal of heat.

Whenever used in this specification, the terms "polymerizing," "polymerization" and "polymer" will be understood also to encompass copolymerizing, copolymerization and copolymer. By "copolymerization" is understood the joint polymerization of beta-lactone with a tertiary or quaternary alpha-carbon atom either with each other or with other polymerizable compounds. Examples of compounds that can be polymerized are beta-lactones with a secondary alpha-carbon atom, epoxy compounds, such as ethylene oxide, propylene oxide, epichlorohydrin, and glycidyl ethers and esters.

In this specification the term "bulk polymerization" denotes polymerization of monomer in the absence of more than 10 weight percent solvents or other inert liquid diluents. As a rule solvents and inert liquid diluents will be totally absent, although small quantities of solvent are permitted and can be conveniently used, for instance, for dosing the catalyst.

The organic compounds of an element of Group Va of the Periodic System are efficient catalysts for the polymerization of lactones to high molecular weight polymers. Tertiary amines, phosphines, and quaternary ammonium and phosphonium compounds are very active catalysts for this purpose. Very suitable tertiary amines are those in which each nitrogen atom is bound to three alkyl groups which together contain no more than nine carbon atoms.

The tri-substituted phosphines, such as triethylphosphine, trimethylphosphine, tripropylphospine, triisopropylphospine, triisobutylphosphine, dimethylhexylphosphine diisopropyl-n-butylphosphine triphenylphosphine, tribenzylphosphine, and tritoylphosphine are preferred phosphorus-containing catalysts. Tri-n-butylphosphine is particularly preferred.

The amounts of catalyst to be employed can vary within relatively wide limits. Quantities of from 0.0001 to 10 mole percent calculated on monomer are suitable. From 0.001 to 0.5 mole percent is preferred.

Among the suitable beta-lactones that can be polymerized by means of the process according to the invention are beta-lactones with a dialkyl-substituted alpha-carbon atom, such as alpha-ethyl-alpha-methyl-beta-propiolactone and alpha, alpha-diethyl-beta-propiolactone. Alpha, alpha-dimethyl-beta-propiolactone (also called pivalolactone) is a preferred beta-lactone.

The beta-lactone and the polymerization catalyst can be supplied to the first reaction zone either separately or together. In the former case the catalyst can be supplied dissolved in a solvent. If the betalactone to be polymerized and the catalyst are supplied together, it is advisable to cool the reaction medium before feeding it to the first reaction zone in order to prevent premature polymerization. Premature formation of polymer may entirely or partly inhibit feed supply to the first reaction zone. Cooling the feed medium to a temperature of from −15° C. to +10° C. is in most cases adequate to prevent polymerization. As described hereinbefore, the temperature of the beta-lactone-containing medium supplied to the first reactor affects the temperature that is reached during polymerization. It is preferred that the system for the supplying the medium to reaction zone be thermally insulated from the first reaction zone so as to prevent heat from being transferred to the supply system. Thermal insulation material can be used for this purpose. It is particularly advantageous to supply the medium via one or more narrow or capillary tubes passing through thermal insulation material to the first reaction zone.

The beta-lactone-containing reaction medium is advantageously introduced into the first reaction zone under pressure. This pressure can be exerted in any desired manner, for instance with the aid of a pump.

When the mixture to be polymerized has been introduced into the first reaction zone it should instantly after introduction be separated from the further mass to be introduced and transported. The formation of dead spaces where polymer may be deposited as a solid which can only be removed with difficulty must be prevented. When a gear pump is used as the first reaction zone a metal mold can be fitted at the pump inlets to largely or completely fill the dead space there. The deposition of solid polymer can also be prevented by introducing the beta-lactone-containing medium at two places, via into the casing of each gear rather than at one as is customary. This arrangement causes the medium to be directly entrained by the turning gear and dead spaces are thereby avoided.

The monomer to be polymerized can contain one or more compounds affecting the molecular weight of the polymer to be formed. Examples of these so-called "chain-transfer agents" are carboxylic acids or anhydrides or acid halides thereof (for instance pivalic acids, hydroxypivalic acid, alpha-chloropropionic acid, acetyl chloride), phenols and thiophenols (for instance phenol), mercaptans (for instance nonylmercaptan), enolizable compounds (for instance acetyl acetone, ethylacetoacetate), alpha-halo ketones (for instance 1,1,1-trichloro-2-propenone, 3-chloro-2-butanone), alpha-halo aldehydes (for instance trichloroacetaldehyde).

The beta-lactone to be polymerized can contain compounds which stabilize the beta-lactone against premature polymerization. These stabilizers need not be removed from the monomer before it is polymerized according to the invention. Examples of these stabilizers include trinitrophenols (for instance picric acid), aromatic sulfonic acids (for instance p-toluenesulfonic acid), $BF_3$-complexes (for instance $BF_3$-tribenzylamine complex), diazonium salts (for instance p-chlorobenzene-diazonium hexaflourophosphate), $BCl_3$-complexes for instance $BCl_3$-tri-benzylamine complex).

Various additives which are inert with respect to the polymerization reaction may be incorporated in the monomer or in the catalyst or in the mixture of monomer and catalyst to be polymerized. Examples of such additives are fillers, pigments, dyestuffs, heat stabilizers (for instance trinonylphenyl phosphite, tetramethylthiuram disulfide), anti-oxidants, stabilizers against ultraviolet light, soot, nucleating agents, dyeability-improving compounds and the like.

The polymer leaving the last reaction zone can be passed into an inert liquid (for instance water or methanol) for cooling. Solidification can also be affected by cooling the polymer to the air. It is also possible to use the polymers formed for melt extrusion into fibers and filaments without prior isolation as a solid. In this latter case dissolved gases can be advantageously removed first, for instance by passing the polymer in the molten state through a screw press with a degassing section. The outlet of the screw press can be provided with a spray nozzle suitable for spinning the fibers and filaments.

The polymers or polymer compositions obtained according to the invention have excellent properties. They can resist high temperatures and in many cases they have a very high melting point. The polymer obtained from alpha, alpha-dimethylpropiolactone, for instance has a melting point between 240° and 250° C.

The polymers are thermoplastic materials which can be made into films, sheets, plates, profiles, tubes, fibers, threads, solid or hollow moldings, and the like with the aid of techniques known in the art (for instance extrusion, molding, blow molding).

The drawings illustrate the invention.

FIG. 1 depicts a block diagram of a device that is suited to be used for the polymerization of a beta-lactone according to the invention. Monomer is supplied via the supply system 1, which is separated from the first reactor 3 by a thermal insulation wall 2. The liquid flowing out of this reactor is passed via tube 4, which is constructed as a narrow tube, to the second reactor 6, which is separated from reactor 3 with the aid of thermal insulation wall 5. The mixture issuing from reactor 6 is discharged via tube 7.

Preferably, the first reactor 3 is designed as a gear pump. FIG. 2 represents a sectional drawing of such a gear pump. The figures used hereinbefore represent the same components in this figure and the following one. Here, 8 and 9 represent two intermeshing gear wheels, while 10 indicates the casing of the pump. The mixture to be polymerized is supplied via zone 11, which is preferably filled for the greater part with a metal mold 12 so as to keep the dead space as small as possible. The mixture is discharged via zone 13.

FIG. 3 gives the section on A—A of the gear pump of FIG. 2 while it also depicts part of the supply system 1 (cooled with cooling liquid via cooler 14), the thermal insulation wall 2 and capillary tube 15 provided for supplying feed to the first reaction zone.

The following example further illustrates the invention.

EXAMPLE

The experiments were performed in an apparatus consisting of a supply line (0.5 cm diameter), a gear pump which displaced 20 ml of liquid per rotation as a first reaction zone, and a tube with a diameter of 1.4 cm and a length of 50 cm as a second zone. The mixture issuing from the second reactor was cooled in water. At the side of the supply line the gear pump was lagged with thermal insulation material. The supply line, narrowed to a diameter of 0.15 cm, was passed through this insulation material to the inlet zone of the gear pump. This inlet zone was about 90 percent filled with a metal mold. The gear pump was connected to the second reactor via a small tube of 3 cm length and 0.6 cm diameter. The temperatures of the casing of the gear pump and the tube serving as second reactor were adjusted to the desired value by means of electric heating.

In all cases the mixture to be polymerized consisted of pivalolactone which contained p-chlorobenzene diazonium hexafluorophosphate as polymerization inhibitor (0.0025 percent m on lactone) and tributylphosphine as polymerization catalyst. This mixture was supplied in the supply line under a pressure of about 40 atmospheres and at a temperature of −10° C. The temperature of the polymerizing mixture in the gear pump was determined with the aid of a thermocouple fitted into the wall of the casing of one of the gear wheels close to the working space and to the outlet side of the pump.

A number of experiments was performed in which the temperature of the casing of the gear pump was kept constant at 245° C. The time of residence in the gear pump was adjusted to 4.7 or 4.8 seconds. The temperature of the reacting mixture was measured to be 270° C with 70 per cent conversion of pivalolactone into polymer. (The conversion value was determined in separate experiments by passing the mixture issuing from the gear pump directly into water. The amount of polymer formed at that point was then measured.) The amount of polymerization catalyst and the temperature in the tube serving as the second reactor were varied. The results are represented in Table I. The LVN is the intrinsic viscosity of the polymer obtained, determined in benzyl alcohol at 150° C.

The table shows that high yields of polymer are obtained, even if the temperature in the second reactor is higher than 300° C.

TABLE I

| $PBu_3$ percent m on lactone | Temperature of tube, ° C. | Residence time, s In pump | Residence time, s In tube | Yield percent m on lactone | LVN, dl./g. |
|---|---|---|---|---|---|
| 0.05 | 275 | 4.8 | 16.6 | 91 | 1.03 |
| 0.05 | 305 | 4.8 | 16.6 | 91 | 1.06 |
| 0.05 | 355 | 4.7 | 16.1 | 89 | 1.03 |
| 0.07 | 275 | 4.8 | 16.3 | 93 | 0.99 |
| 0.07 | 305 | 4.8 | 16.3 | 93 | 0.99 |
| 0.07 | 355 | 4.7 | 16.1 | 93 | 0.95 |

For comparison, experiments were carried out in the same supply line and gear pump but without a second reactor, while the temperature of the polymerizing mixture in the gear pump was maintained higher than 300° C. At the end of each experiment no more unconverted pivalolactone was present. Table II shows that the yield of polymer was lower than with the process according to the invention.

TABLE II

| $PBu_3$, percent m on lactone | Temperature, ° C. Casing of pump | Temperature, ° C. Polymerizing mixture | Residence time in pump, s | Yield percent m on lactone | LVN, dl./g. |
|---|---|---|---|---|---|
| 0.05 | 355 | 350 | 10.8 | 82 | 0.73 |
| 0.07 | 305 | 320 | 12.0 | 88 | 0.95 |
| 0.07 | 355 | 350 | 10.0 | 86 | 0.85 |

We claim:

1. A multi-step process for the continuous bulk polymerization of an alpha, alpha-dialkyl betalactone which comprises subjecting said beta-lactone to polymerization at a temperature up to 300° C. in an initial reaction zone comprising a working space wherein a discrete quantity of liquid is separated from the bulk of the liquid to effect the transport of said liquid through said initial reaction zone until 50 to 85 percent of said lactone has been converted to polymer and thereafter continuing said polymerization in at least one subsequent reaction zone, wherein in said subsequent reaction zones, the polymerization is allowed to proceed without the addition or removal of heat, said initial reaction zone and said subsequent reaction zones being thermally insulated from each other.

2. A process according to claim 1, characterized in that said initial reaction zone comprises a gear pump.

3. A process according to claim 1, characterized in that said beta-lactone supplied to said initial reaction zone has been cooled to a temperature of between −15° C. and +10° C.

4. A process according to claim 1, characterized in that the temperature of the beta-lactone in the first reaction zone is maintained between 250° and 300° C.

5. A process according to claim 1, characterized in that in the first reaction zone between 60 and 85 percent of the beta-lactone is polymerized in said zone.

6. A process according to claim 1, characterized in that the beta-lactone is alpha,alpha,dimethyl-beta-propiolactone.

* * * * *